United States Patent [19]

Sugiura et al.

[11] Patent Number: 5,790,270
[45] Date of Patent: Aug. 4, 1998

[54] IMAGE PROCESSING APPARATUS

[75] Inventors: Masamichi Sugiura; Akio Nakajima; Hiroyuki Suzuki, all of Toyokawa, Japan

[73] Assignee: Minolta Co., Ltd., Osaka, Japan

[21] Appl. No.: 467,854

[22] Filed: Jun. 6, 1995

Related U.S. Application Data

[63] Continuation of Ser. No. 90,999, Jul. 13, 1993, abandoned, which is a continuation of Ser. No. 663,418, Mar. 1, 1991, abandoned.

[30] Foreign Application Priority Data

| Mar. 2, 1990 | [JP] | Japan | 2-52468 |
| Mar. 2, 1990 | [JP] | Japan | 2-52469 |
| Mar. 2, 1990 | [JP] | Japan | 2-52470 |
| Mar. 2, 1990 | [JP] | Japan | 2-52471 |

[51] Int. Cl.⁶ .................. H04N 1/40; H04N 1/00
[52] U.S. Cl. .................. 358/448; 358/400; 358/440; 358/468
[58] Field of Search .................. 358/400, 401, 358/403, 404, 434, 436, 438, 440, 443, 448, 450, 451, 452, 468

[56] References Cited

U.S. PATENT DOCUMENTS

| 4,398,222 | 8/1983 | Ogawa | 358/438 |
| 4,414,579 | 11/1983 | Dattilo et al. | 358/498 |
| 4,731,658 | 3/1988 | Koseki | 358/287 |
| 4,754,335 | 6/1988 | Izawa et al. | 358/256 |
| 4,772,955 | 9/1988 | Kurahayashi et al. | 358/257 |
| 4,821,107 | 4/1989 | Naito et al. | 358/440 |
| 4,860,111 | 8/1989 | Shimizu | 358/400 |
| 4,860,115 | 8/1989 | Ogura | 358/443 |

FOREIGN PATENT DOCUMENTS

| 1-49367 | 2/1989 | Japan | H04N 1/00 |

*Primary Examiner*—Thomas D. Lee
*Attorney, Agent, or Firm*—Sidley & Austin

[57] ABSTRACT

An image processing apparatus includes a copying machine and a central processing apparatus provided with a facsimile function. When originals are distributed to a plurality of destinations, a destination list is stored in the central processing apparatus in advance. At this time, as to the destinations to which originals are transmitted through the facsimile, telephone numbers thereof are simultaneously stored. The central processing apparatus controls the copying machine and the facsimile function on the basis of the stored data, so that originals are sent by the facsimile to places to which they should be sent by the facsimile, and also copied originals are sent to places to which they should, respectively.

10 Claims, 15 Drawing Sheets

FIG.15

DESTINATION FILE

| RECORD NUMBER | DESTINATION NAME | DESTINATION INFORMATION |
|---|---|---|
| 1 | SALES DIV. SECTION 1 MANAGER aaa | 03-001-0001 |
| 2 | SALES DIV. SECTION 2 MANAGER bbb | 03-001-0002 |
| 3 | SALES DIV. SECTION 3 MANAGER ccc | |
| 4 | SALES DIV. SECTION 3 CHIEF ddd | |
| 5 | SALES DIV. SECTION 3 eee | |
| 6 | SALES DIV. SECTION 3 fff | |
| 7 | SALES DIV. SECTION 4 MANAGER ggg | |
| 8 | SALES DIV. SECTION 4 CHIEF hhh | |
| 9 | SALES DIV. SECTION 4 iii | |
| 10 | GENERAL AFFAIRS SECTION MANAGER jjj | 03-001-0003 |
| 11 | GENERAL AFFAIRS SECTION CHIEF kkk | |

FIG.16

DESTINATION LIST

| |
|---|
| SALES DIV. SECTION 1 MANAGER aaa |
| SALES DIV. SECTION 2 MANAGER bbb |
| SALES DIV. SECTION 3 MANAGER ccc |
| SALES DIV. SECTION 3 CHIEF ddd |
| SALES DIV. SECTION 3 eee |
| SALES DIV. SECTION 3 fff |
| SALES DIV. SECTION 4 MANAGER ggg |
| SALES DIV. SECTION 4 CHIEF hhh |
| SALES DIV. SECTION 4 iii |
| GENERAL AFFAIRS SECTION MANAGER jjj |
| GENERAL AFFAIRS SECTION CHIEF kkk |

FIG.18

TRANSMISSION LIST

| RECORD NUMBER | ORIGINAL PAGE NUMBER |
|---|---|
| 1 | 1 |
| 1 | 2 |
| 1 | 3 |
| 2 | 1 |
| 2 | 2 |
| 2 | 3 |

IMAGE PROCESSING APPARATUS

This application is a continuation of application Ser. No. 08/090,999, filed Jul. 13, 1993, which, in turn, is a continuation of application Ser. No. 07/663,418, filed Mar. 1, 1991, both now abandoned.

BACKGROUND OF THE INVENTION

1. Field of the Invention

The present invention relates to image processing apparatus employed for widely distributing documents, and particularly to image processing apparatus capable of simultaneously performing copying operation and/or image transmitting operation.

2. Description of the Related Art

Image transmission has been conventionally performed using broadcast devices of facsimile apparatus. In this kind of broadcast devices of facsimile apparatus, destinations for distribution (hereinafter, referred to as destinations) of originals are stored in memories for sequential communication to particular destinations for transmission.

Broadcast apparatus of conventional facsimile apparatus are provided with functions as facsimile apparatus only and do not have functions for operating together with copying machines.

In consideration of practice in the office work, however, copied versions of originals are distributed, not facsimile transmission, to particular destinations. Accordingly, both of the copying process and the transmission process are performed. Therefore, an operator has to selectively perform a copying process or a transmission process depending on destinations. As a result, the operation is complicated, so that operational mistakes are not rare.

SUMMARY OF THE INVENTION

Accordingly, it is an object of the present invention to handle copying and transmitting operations of originals together in image processing apparatus.

It is another object of the present invention to implement efficient office work in image processing apparatus.

It is still another object of the present invention to reduce operational mistakes in image processing apparatus.

The above objects of the present invention are achieved by image processing apparatus including the following elements. That is, an image processing apparatus according to the present invention includes.; a reader for reading an image of an original to produce image data, a copying device for performing a copying process for forming an image on paper on the basis of the image data, a transmitter for performing a transmitting process of transmitting the image data to a receiver, a memory for storing destination information related to destinations, a determination device for making a determination as to whether the copying process should be carried out or the transmitting process should be carried out on the basis of the destination information, and a controller for controlling the copying device and the transmitter in response to the determination result of the determining device.

In the image processing apparatus including the above elements, a determination is made as to whether a copying process should be carried out or the transmitting process should be carried out for respective destinations on the basis of the destination information stored in the memory in distributing an image to a plurality of destinations. According to the determination results, the copying process and the transmitting process for the original image are performed. As a result, in the image processing apparatus, copying and transmission of the original are handled together.

In another aspect of the present invention, an image processing apparatus includes.; a reader for reading an image of an original for producing image data, a memory for storing destination information related to a plurality of destinations, a combining device for combining the image data from the reader and the destination information to produce synthetic data, a copying device for performing a copying process for forming an image on paper on the basis of the synthetic data, a transmitter for carrying out a transmitting process for transmitting the synthetic data to a receiver a determining device for making a determination as to whether the copying process should be carried out or the transmitting process should be carried out to each of the destinations on the basis of the destination information, and a controller for controlling the copying device and the transmitter in response to the determination results of the determining device.

With the image processing apparatus including the above elements, the destinations are combined with the image data, and a copying or transmitting operation is performed on the basis of the destination data. As a result, without separately making out the first page for indicating destinations, efficient office work is implemented in image processing apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a diagram for describing a destination file employed in image processing apparatus of one embodiment of the present invention.

FIG. 16 is a diagram for describing a destination list employed in image processing apparatus of one embodiment of the present invention.

FIG. 18 is a diagram for describing a transmission list employed in image processing apparatus of one embodiment of the present invention.

DESCRIPTION OF THE PREFERRED EMBODIMENTS

Figure 1:
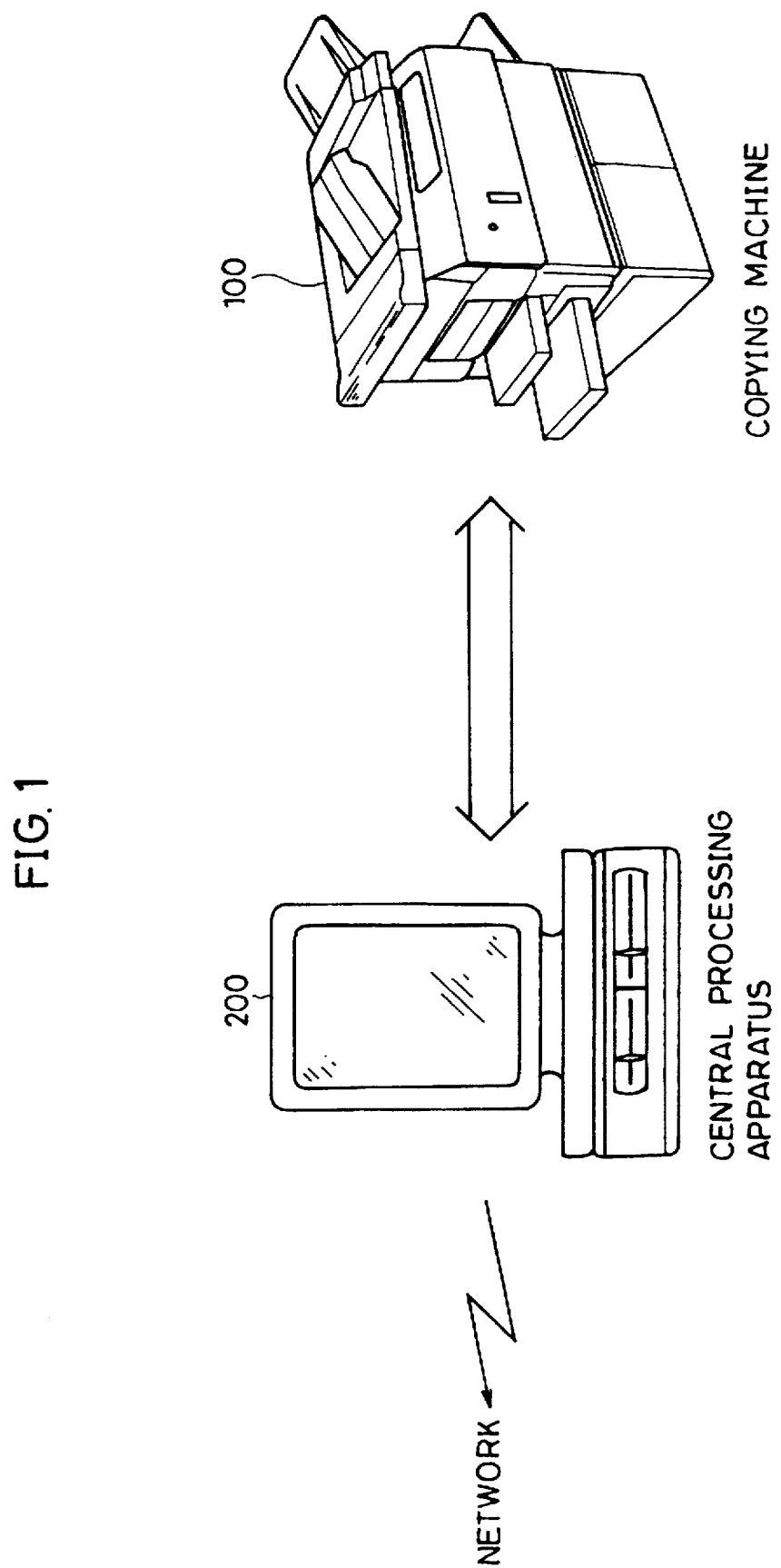
FIG. 1 is a system configuration diagram as an image processing apparatus of one embodiment of the present invention.

Referring to FIG. 1, a system of an image processing apparatus in accordance with the present invention includes a central processing apparatus 200. The central processing apparatus 200 is provided with functions as a well-known personal computer and includes an image memory therein. The central processing apparatus 200 is connected to a copying machine 100 serving as an input/output device. Copying machine 100 includes an image reader for converting an original into digitized image data and an image forming portion for recording the digitized image data. The central processing apparatus 200 receives/outputs the read image data, and receives and sends information from and to another central processing apparatus 200 and a copying machine 100 provided with a facsimile function through a network such as a telephone line.

Figure 2:
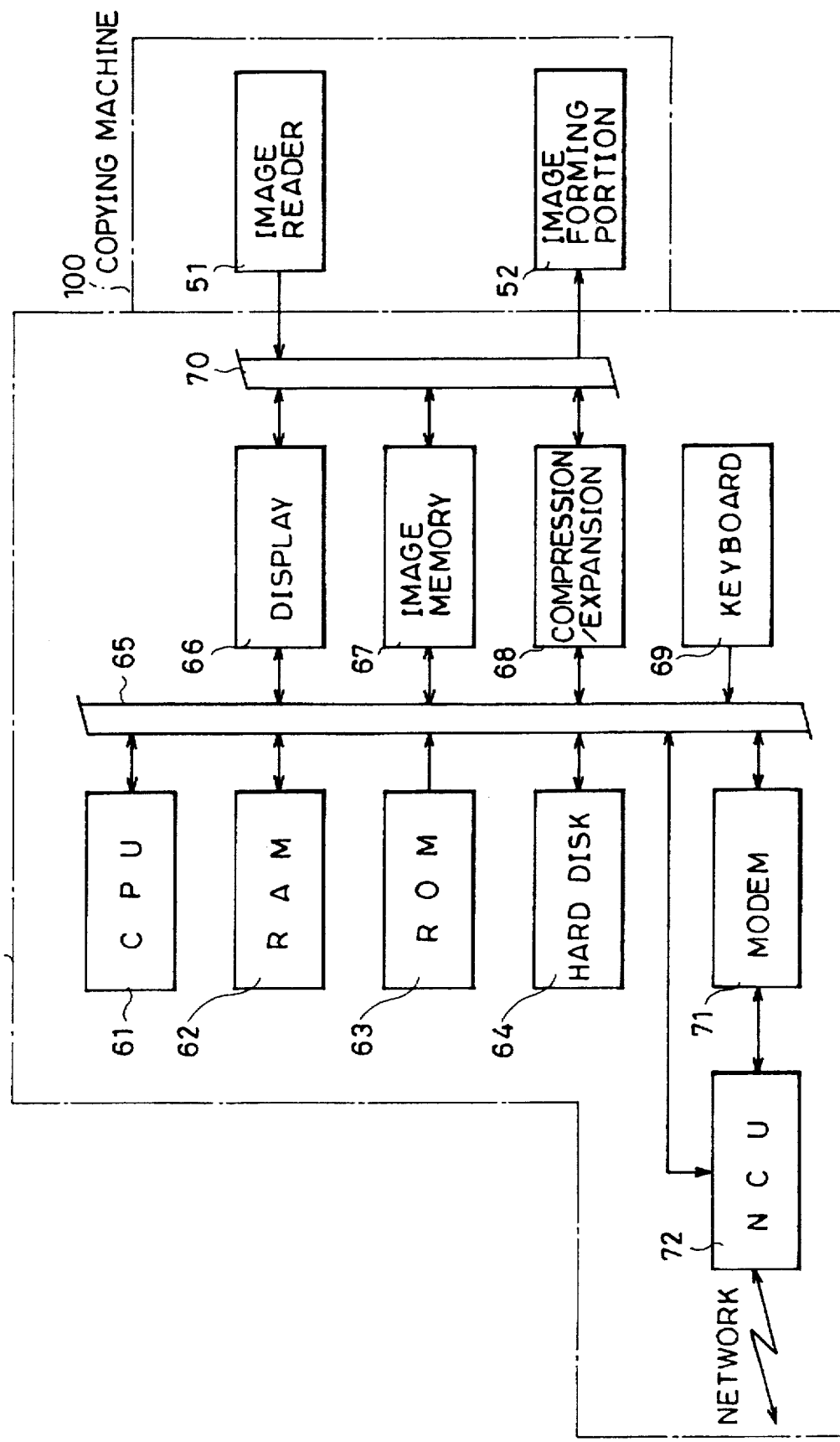
FIG. 2 is a block diagram of an entirety of an image processing apparatus in accordance with one embodiment of the present invention.

Referring to FIG. 2, the copying machine 100 includes an image reader 51 for obtaining digitized image data and an image forming portion 52 for recording the digitized image data. The image reader 51 and the image forming portion 52 are connected to an image bus 70 of central processing apparatus 200.

The central processing apparatus 200 includes a CPU (Central Processing Unit) 61 for performing program processing and operation according to a predetermined program stored in a ROM (Read Only Memory) 63 by employing a RAM (Random Access Memory) 62. The apparatus 200 also includes a hard disc 64 for storing various kinds of determined information such as destinations of the documents, and the number of sheets to be distributed, a display 66 such as a CRT for displaying control information, and an image memory 67 having a predetermined capacity capable of storing image data at least for one screen or more for reading an original and storing digitized image data. The central processing apparatus 200 further includes a compression/ expansion unit 68 for performing data compression or data expansion in transmission and reception when transmitting the image data through a communication line, a keyboard 69 for key input, a modem 71 employed when transmitting or receiving the image data through a network, and an NCU (Network Control Unit) 72 receiving/sending a signal from modem 71 and a signal to the network for the network.

A program required for operating an image processing apparatus of the present embodiment which will be described later is stored in ROM 63, and CPU 61 controls as a whole hard disc 64, display 66, image memory 67, compression/expansion 68, keyboard 69, modem 71, NCU 72 and the like in accordance with the program in the ROM 63 employing the RAM 62.

Here, the hard disc 64 storing various kinds of determined information such as destinations of the documents, the number of sheets to be distributed and so forth constitutes a storage portion for storing destination information of specified places for transmission.

Figure 3:
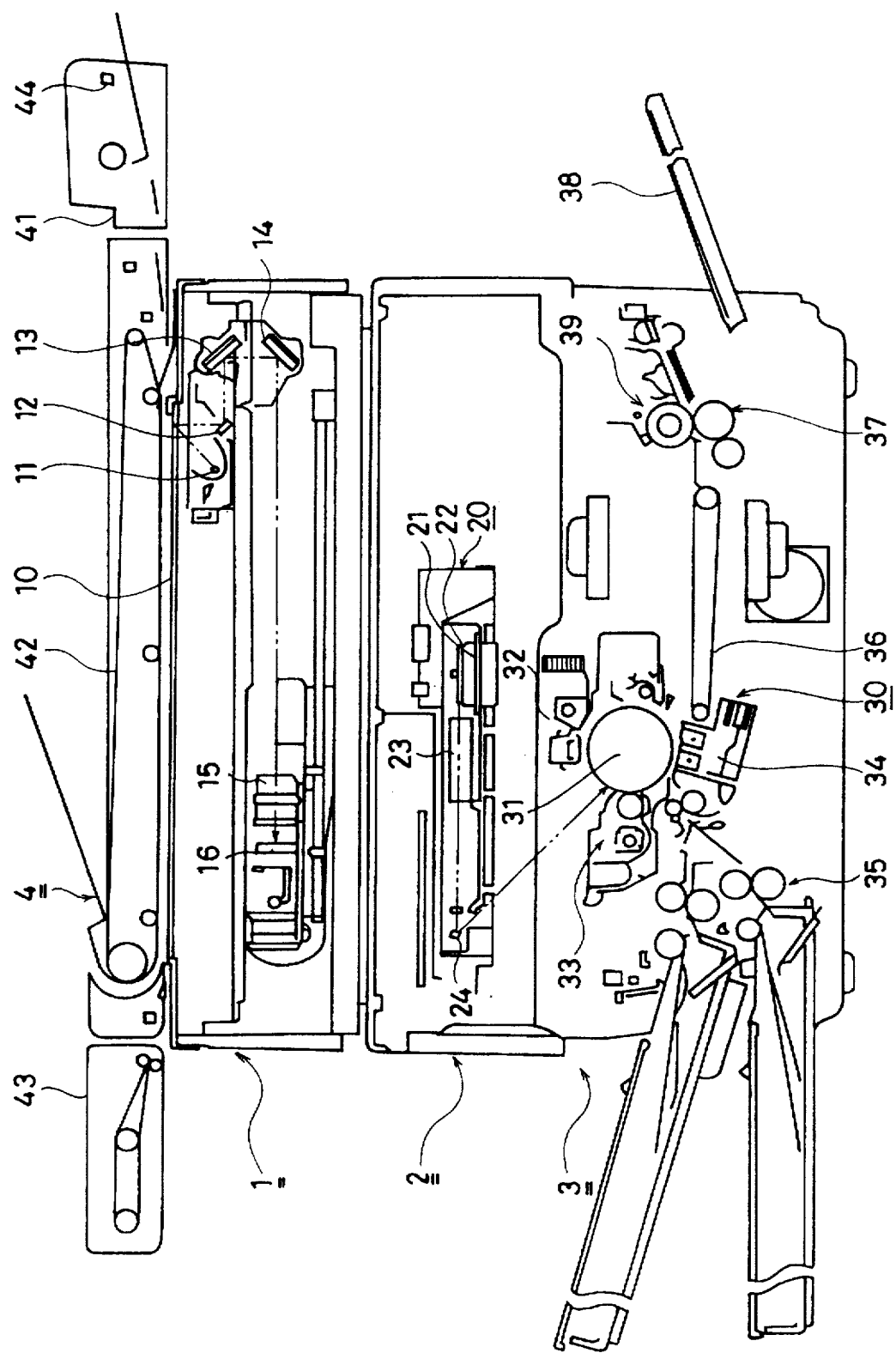
FIG. 3 is a schematic configuration diagram showing a configuration of a copying machine employed as an image processing apparatus in accordance with one embodiment of the present invention.

Referring to FIG. 3, a reader 1 has the configuration schematically described below.

That is, when an original is set on a platen glass 10 with its read side facing downward, an exposure lamp (light source) 11 radiates light to the original, and a mirror system including first, second, third mirrors 12, 13, 14 guides the light reflected from the original surface to a lens 15. The reflected light converged here is focused upon a CCD 16, which records the image data of the original image. The lens 15 forms a reduction optical system for focusing the original reduced to a predetermined size on CCD 16. The exposure lamp 11, and first, second, third mirrors 12, 13, 14 integrally move in the right and left directions of FIG. 3 for scanning.

A printer 2 includes a laser head portion 20 and a developing/fixing portion 30 provided thereunder, which has a configuration as schematically described below.

That is, upon receiving the image data as an electrical signal, laser diode 21 electric-photo converts the electric signal to output it as a laser beam. The laser beam scans a polygon mirror 22 in the axial direction, and the scan light exposures the photoreceptor on the surface of photoreceptor drum 31 of developing/fixing portion 30 through f-θ lens 23 and a fourth mirror 24.

The photoreceptor drum 31 is evenly charged by a corona charger 32 prior to the exposure, and an electrostatic latent image corresponding to the image data received in exposure is formed thereon. A developing device 33 supplies toner to the electrostatic latent image to form atoner image, and then a transfer charger 34 transfers the toner image on paper (not shown) fed from a paper feed portion 35 in an appropriate timing. The paper is separated from photoreceptor drum 31 after transfer, sent to a thermal fixing device 37 by a transporting belt 36, and then discharged out of the apparatus from a paper discharge tray 38 after a fixing process.

An ADF (Automatic Document Feeder) 4 includes an original placing portion 41, transporting portion 42 and an original conversion unit 43 attached as needed. Original placing portion 41 has an original existence detecting sensor 44, an original feed roller and an original tray. The transporting portion covers an original stand 10, which stops the original sent by the original feed roller at a predetermined position on original stand 10 with the original transporting belt. The original conversion unit includes an original conversion unit driving motor, and a switching claw for switching discharge of originals to an original discharge tray and feeding to the original conversion unit.

The structure and copying operation of the copying machine, as they are well known, will be briefly described in each routine of an embodiment of an image processing apparatus described below.

Next, using the flow chart diagrams of FIGS. 4 through 13, operation of the image processing apparatus of the present embodiment will be described.

Figure 4:
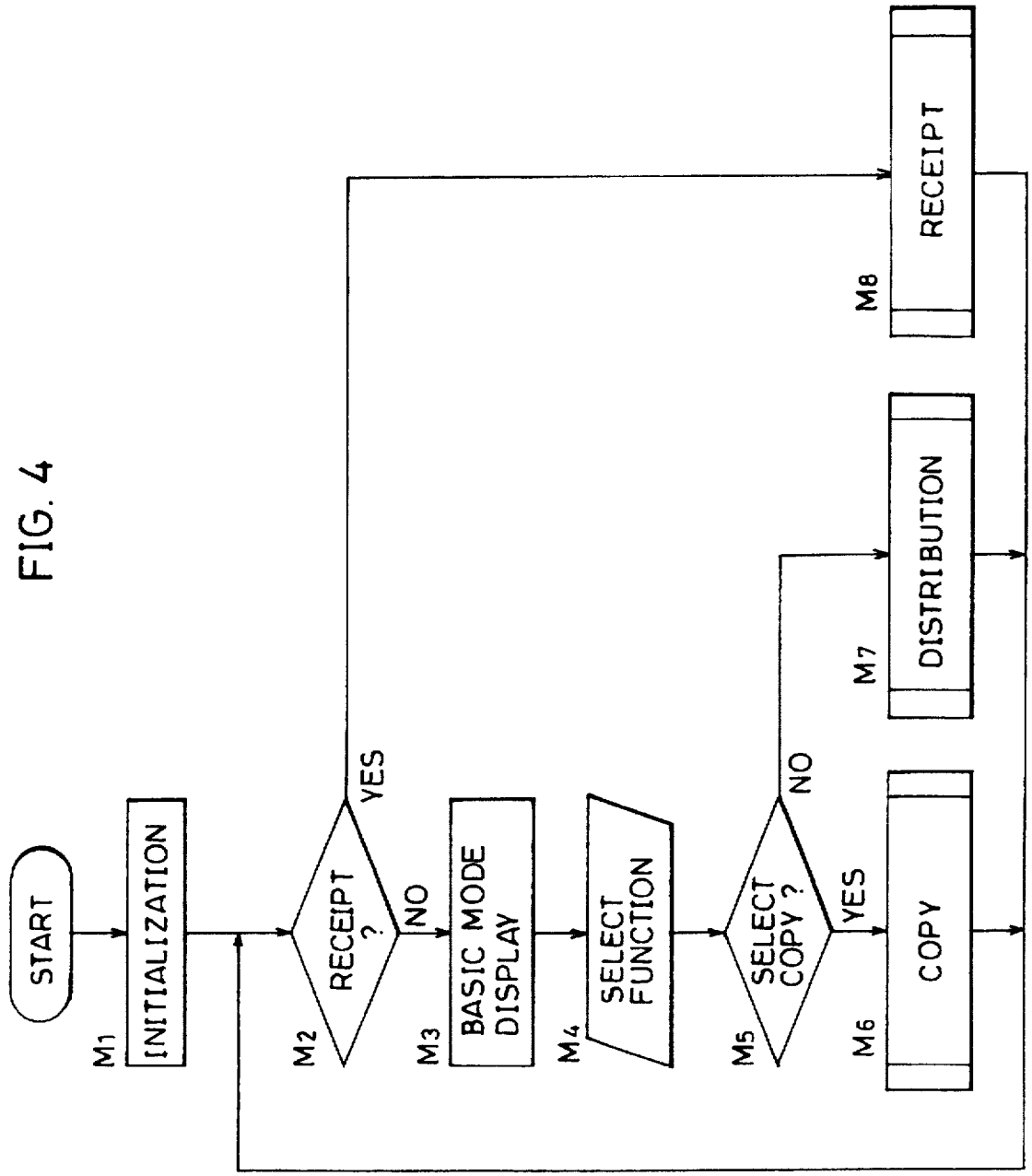
FIG. 4 is a flow chart diagram of a main program of an image processing apparatus in accordance with one embodiment of the present invention.

In FIG. 4, initialization is made in step M1. In step M2, a determination is made as to whether reception from other image processing apparatus has been made or not, and in the case of no receipt, in step M3, functions to be processed thereafter are displayed in an image plane of the CRT. In step M4, functions to be operated from now are inputted with keyboard 69. At this time, a size of a copy paper may be automatically determined on the basis of the size of an original detected in ADF 4 and a set magnification value. An input function is determined in step M4, and a "copy" routine or a "distribution" routine is selected in step M5 accordingly. The "copy" routine is called in step M6 and the "distribution" routine in step M7. The routine from step M2 to step M6 or to step M7 is repeatedly carried out.

When a determination is made that receipt from other image processing apparatus exists in step M2, a "reception" routine is called in step M8 and then the routine from step M2 to step M8 is repeatedly carried out.

Next, firstly, a flow chart of an "image input" subroutine called in the "copy" and "distribution" routines and a flow chart of an "image output" subroutine will be described.

Figure 5:
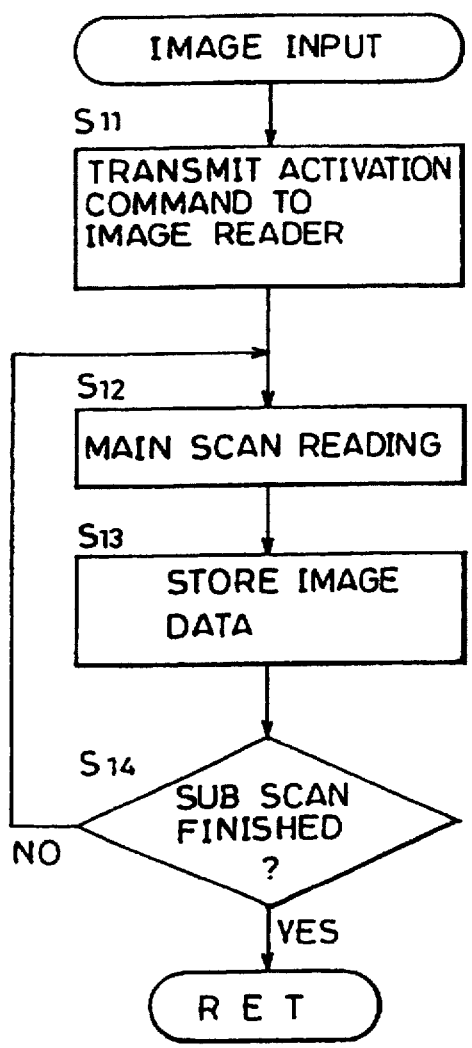
FIG. 5 is a flow chart diagram of an "image input" subroutine employed in an image processing apparatus of one embodiment of the present invention.

In the "image input" subroutine of FIG. 5, an activation command is transmitted to image reader 51 of copying machine 100 in step S11 to activate copying machine 100. In step S12, the original image is read in the main scanning direction, and the image data is stored in image memory 67 in step S13. Then, upon completion of sub-scanning of copying machine 100 in step S14, the image data reading is finished to end this routine.

Figure 6:
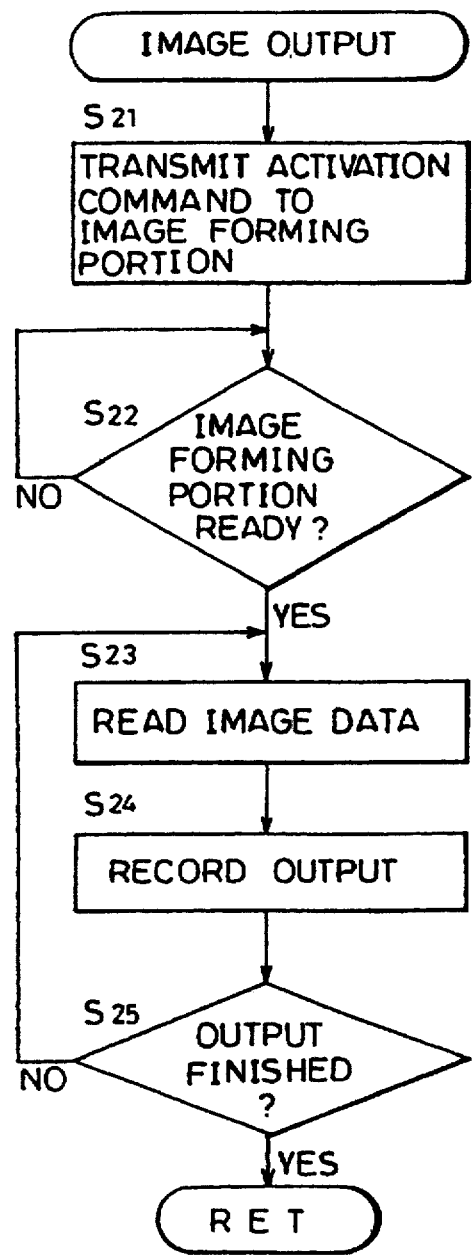
FIG. 6 is a flow chart diagram of an "image output" subroutine employed in an image processing apparatus of one embodiment of the present invention.

In the "image output" subroutine of FIG. 6, in step S21, an activation command is transmitted to image forming portion 52 of copying machine 100 to activate copying machine 100. A determination is made that stable temperature conditions are implemented in an image forming system 3, a paper discharge/feed system 4 for feeding paper and fixing an image and the like in step S22, and in step S23, the read image data of the original image are read out from image memory 67, which are formed as a record image in image forming portion 52 of copying machine 100 in step S24. When a determination is made that image recording in all the main-scanning directions and sub-scanning directions is finished in step S25, this routine ends.

Figure 7:
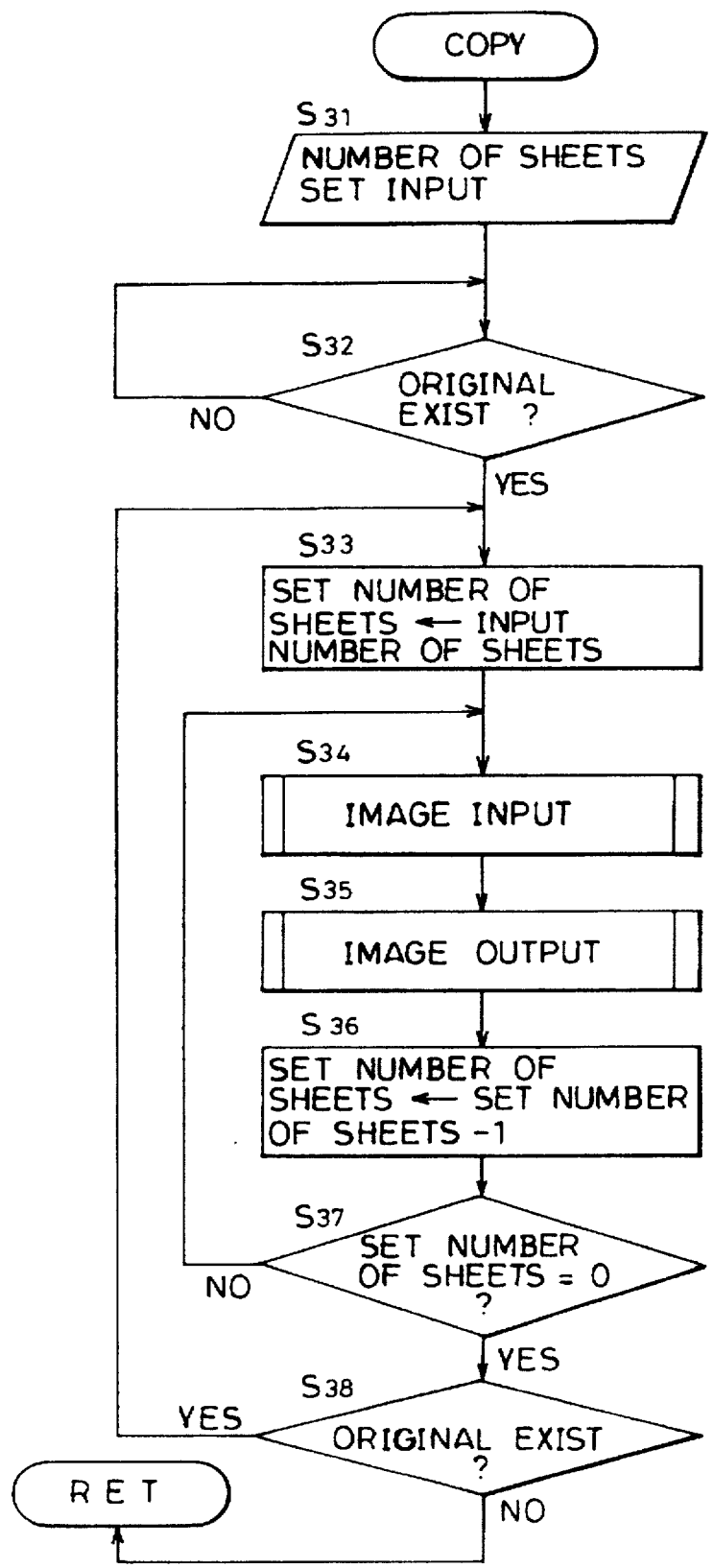
FIG. 7 is a flow chart diagram of a "copy" routine employed in an image processing apparatus of one embodiment of the present invention.

The "copy" routine is called in step M6, and then the process in the "copy" routine of FIG. 7 is started.

In the "copy" routine of FIG. 7, first, the number of copy sheets is inputted in step S31. In step S32, a determination is made as to whether there is an original in original placing portion 41 of ADF4 or not, and when there is, the set number of sheets is regarded as the input number of sheets in step S33. An activation command is transmitted to image reader 51 to call the "image input" subroutine in step S34, and an activation command is transmitted to the image forming portion 52 to call the "image output" subroutine in step S35. Upon a determination of completion of recording, in step S36, the set number of sheets to be copied is decremented by "1" from the present set number, and a determination is made as to whether the decremented set number of sheets is equal to "0" or not in step S37. When it is not equal to "0", the routine from steps S34 to S37 is repeatedly carried out, and when it attains a predetermined set number of sheets set in step S31, a determination is made as to whether the next original exists on original placing portion 41 of ADF 4 in step S38. When there is an original on original placing portion 41, the routine from step S33 to step S38 is repeatedly carried out, and the routine ends when it is determined that the next original does not exist on original placing portion 41 of ADF 4 in step S38.

Figure 8:
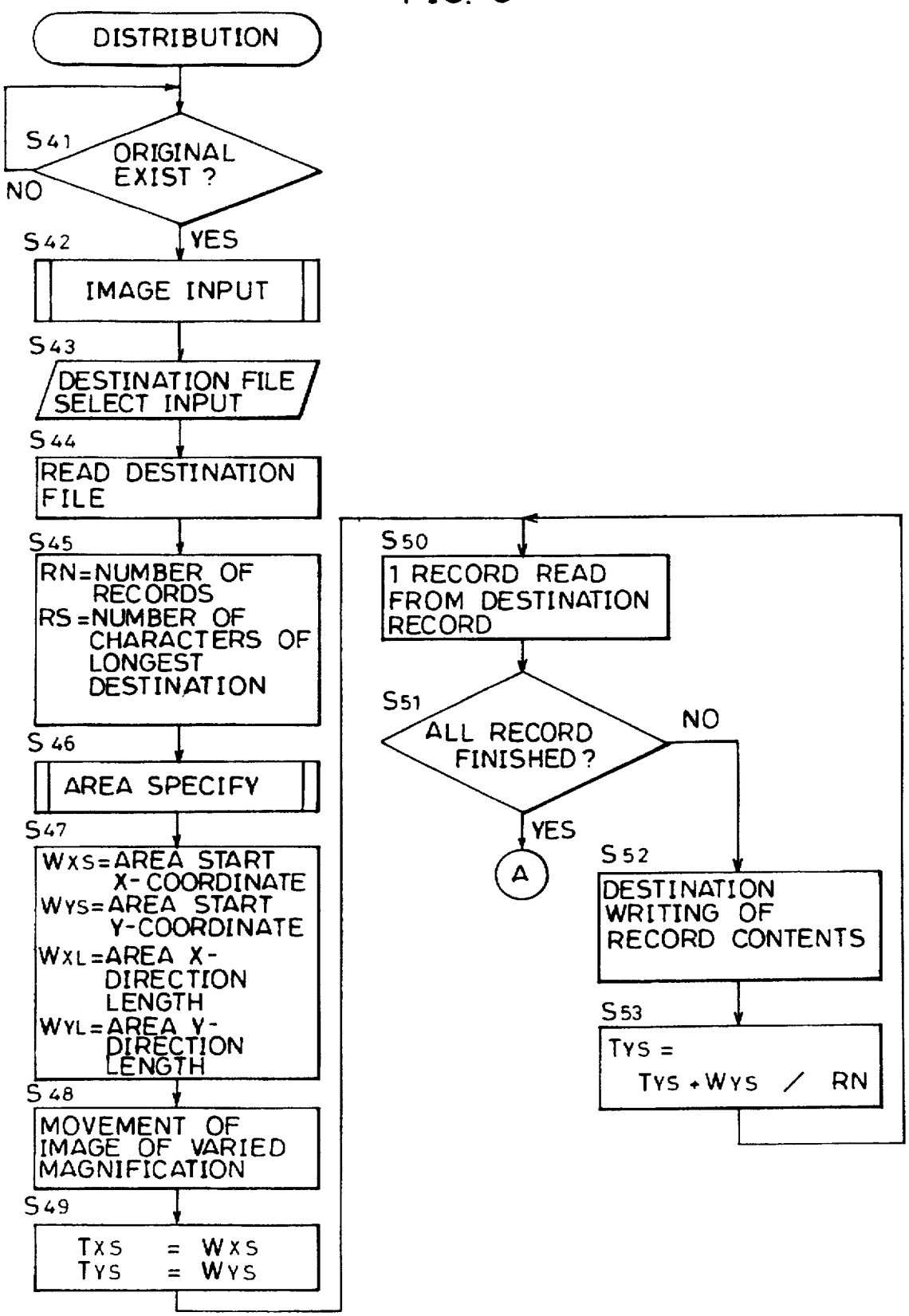
FIGS. 8 through 10 are flow chart diagrams of a "distribution" routine employed in an image processing apparatus of one embodiment of the present invention.
Figure 9:
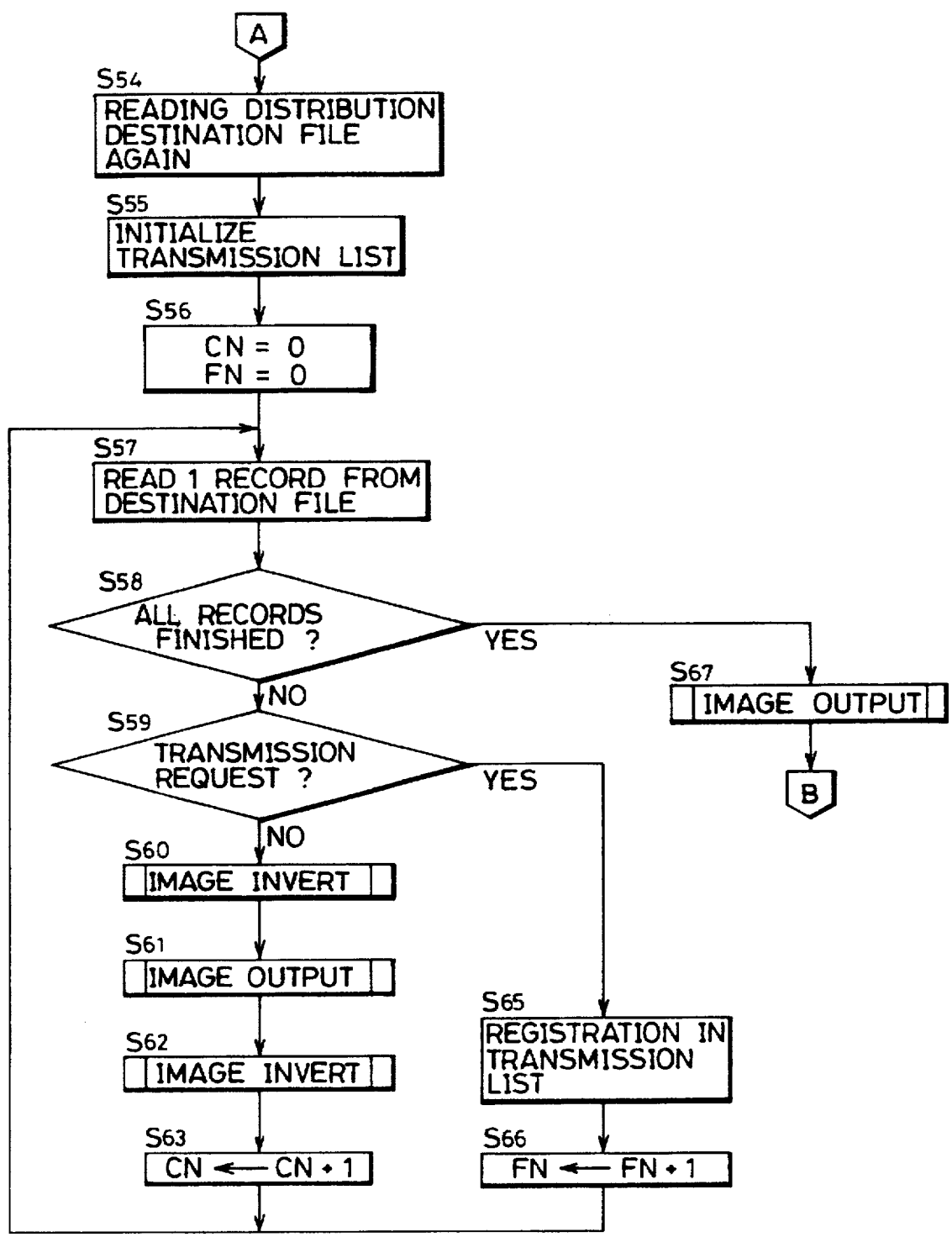
Figure 10:
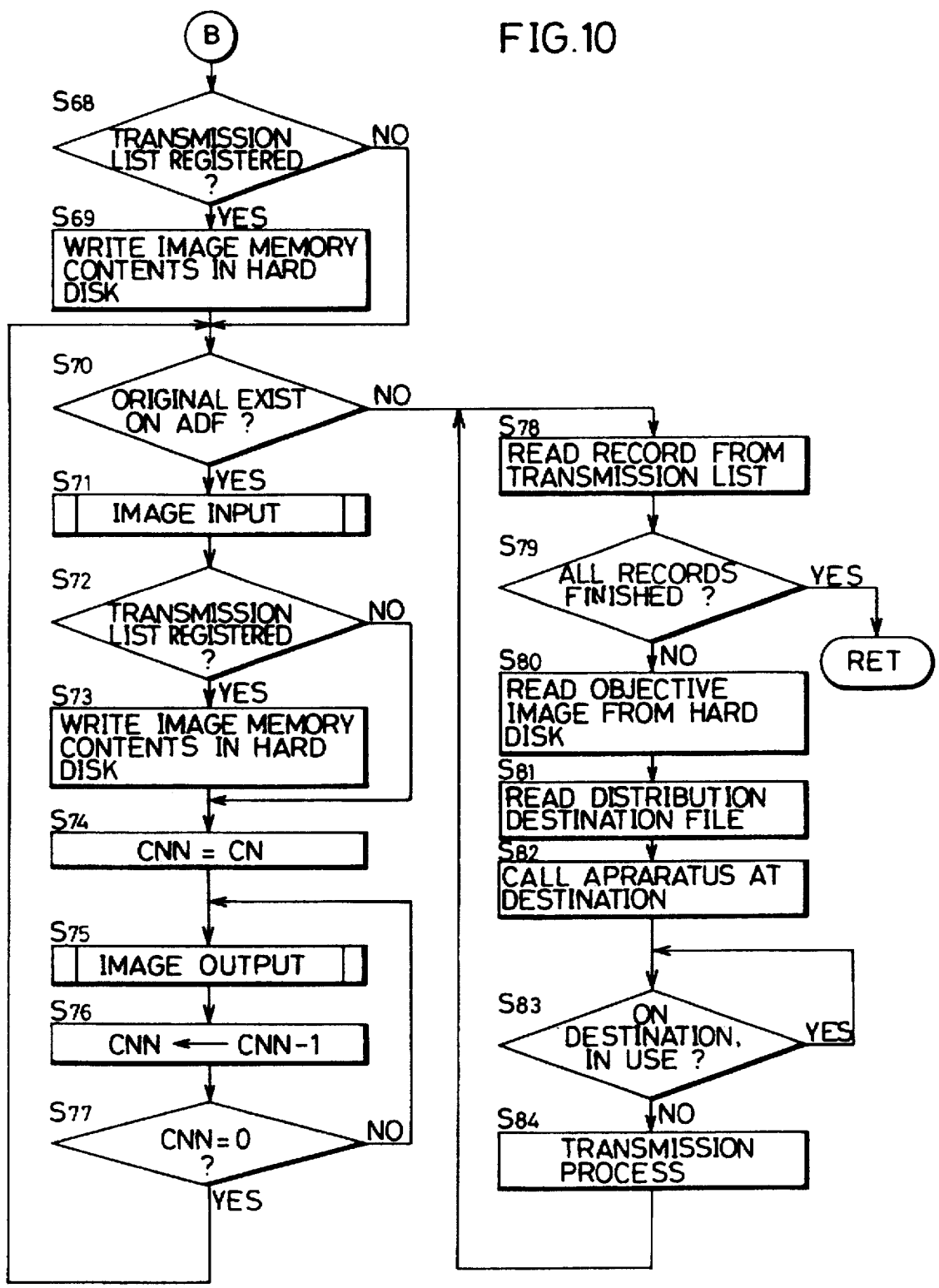

Next, if the "distribution" routine is called in the above step M7, the flow chart of the "distribution" routine shown in FIGS. 8–10 is carried out.

A determination is made as to whether there is an original on the original placing portion 41 of ADF 4 or not in step S41. Original placing portion 41 detects that with original presence/absence detecting sensor 44, and when there is an original on original placing portion 41, the "image input" subroutine is called in step S42, and a name of the destination file in which a destination list to be used is stored is inputted by keyboard 69 in step S43. From the specified destination file stored in hard disc 64, the number of records and the record sizes, that is, the number of distribution, the length of characters of posts and names of the destinations and the like, are inputted in memory RN, memory RS in step S44. The "area specify" routine is called for specifying a position and a size of the list information in step S46 on the basis of the memory RN, memory RS obtained in step S45. In step S47, as parameters, each information obtained by carrying out the "area specify" routine is stored as, the area starting X-coordinates in the memory $W_{XS}$, the area starting Y-coordinates in the memory $W_{YS}$, the length in the X direction of area in the memory $W_{XL}$, and the length in the Y direction of area in the memory $W_{YL}$. In step S48, the "movement of the image of varied magnification" routine for variable scale magnification and/or movement of the image data read with the parameters is called for varied scale magnification to a predetermined size and movement. In step S49, initial values $W_{XS}$, $W_{YS}$ are set for list information writing positions $T_{XS}$, $T_{YS}$. In step S50, 1 record is read from the destination file in a record unit, and in step S51, a determination is made as to whether reading from the destination file is completed or not, and if it is not finished, the record contents read in step S50 are written in the image memory 67 in step S52. Then, the size of a character is $W_{XL}/RS$, and the height of the character is $W_{YL}/RN$. Subsequently, in step S53, as an address of the next list information writing position $T_{YS}$, it is obtained as $T_{YS}=T_{YS}+W_{YL}/RN$.

That is, in the routine from step S41 to step S53, a predetermined area is formed on the first original according to the destinations shown in the example of a destination file stored in hard disc 64 of the present embodiment shown in FIG. 15. In the formed area, the destinations are written.

If a determination of completion of reading from the destination file is made in step S51, the destination file is read again in step S54, and furthermore, a transmission list is initialized in step S55. The number of copies CN and the number of facsimile transmission FN are cleared in step S56.

One record is read out from the destination file in step S57, and a determination of completion of reading the destination file is made in step S58. If it is not finished, in step S59, a determination is made as to whether a transmission is requested, that is, whether or not the facsimile numbers or other written communication destinations exist in the record contents read in step S59. If there is a transmission request, the request is registered in the transmission list in step S65. As shown in the diagram for describing an example of a transmission list stored in hard disc 64 of this embodiment of FIG. 18, in this transmission list, record numbers and original page numbers are written, and the image contents stored in the order of pages of the original are arranged in the order of transmission.

In step S66, the number of facsimile transmission FN is incremented by "1", and again 1 record is read from the destination file in step S57.

Figure 17:
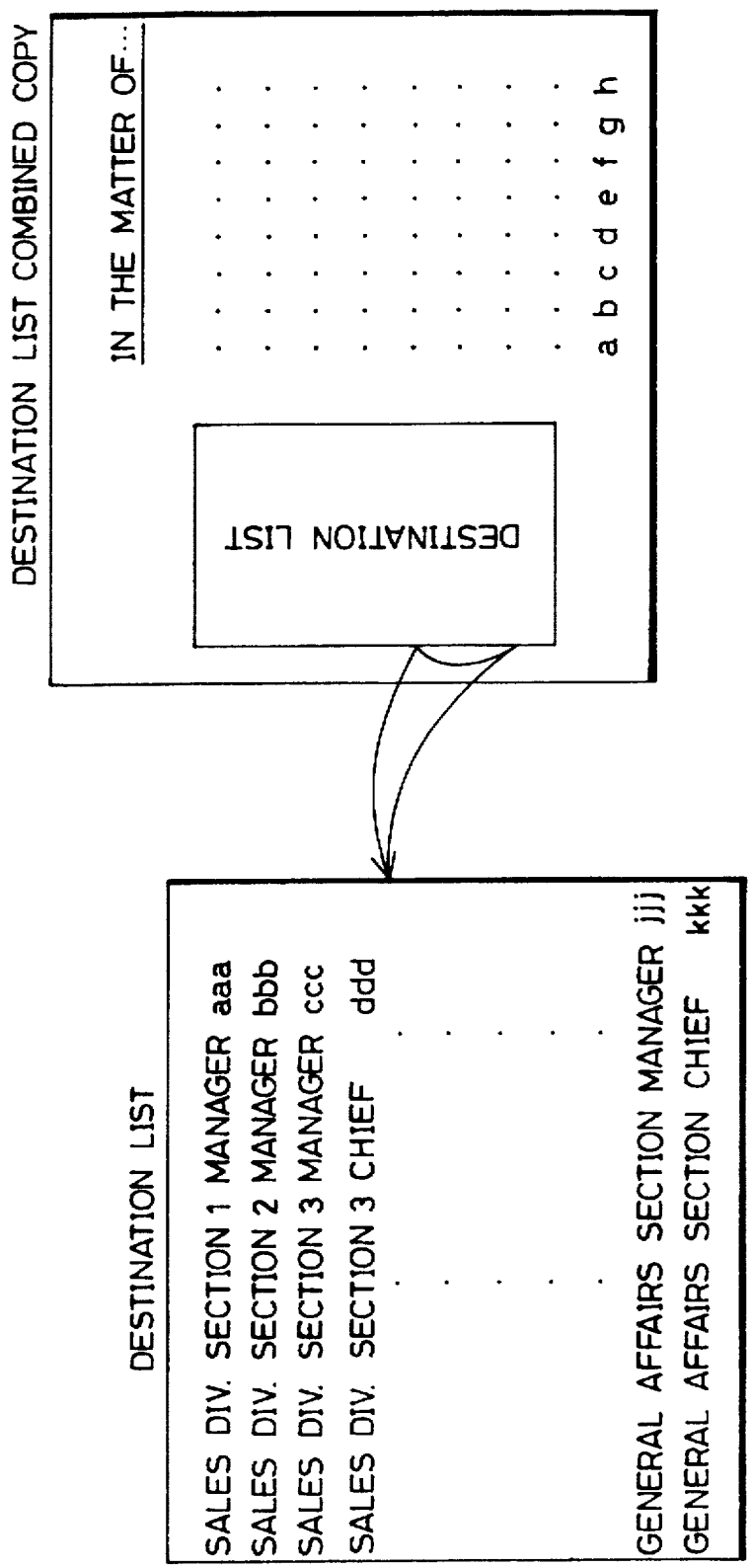
FIG. 17 is a diagram for describing a list composite copy employed in image processing apparatus of one embodiment of the present invention.

In step S58, a determination is made as to whether reading from the determination file is finished or not. If it is not finished, in step S59, a determination is made as to whether there is a transmission request in the read record contents, and when there is no transmission request, the "image inversion" routine for image conversion to clearly find out a destination is called in step S60, and subsequently, in step S61, the "image output" subroutine is called, and thus copies are obtained with image-inverted destinations displayed so that destinations can be clearly found out. In copies at this time, as shown in the diagram for describing an example of the destination list composite copy of the embodiment of FIG. 17, the "image inversion" routine is called again in order to return the inverted image to the original condition in step S62, and the number of cases of copying CN is incremented by "1" in order to count the number of all cases of copies in step S63. Then, the routine from step S57 to step S63 or the routine from step S57 to step S66 is carried out.

During the processing, when a determination is made that reading from the destination file is finished in step S58, the "image output" subroutine for obtaining a copy as a duplicate is called in step S67.

That is, in the routine from step S54 to step S67, the destinations to which copies are distributed are made clear by image inversion. The number of cases for copying necessary for setting the number of copies after page 2 is counted, and then a transmission list for transmission by a transmission function is formed.

Next, in step S68, a determination is made as to whether or not a destination is registered in a transmission list for the image stored in image memory 67 at the present time, and if the data is registered in the transmission list, in step S69, the contents of image memory 67 are written in hard disc 64. If a determination is made that the data is not registered in the transmission list, after the determination in step S68, a process for originals after page 2 is started.

After writing contents of image memory 67 into hard disc 64 in step S69, a determination is made as to whether there are originals after page 2 on original placing portion 41 of ADF 4 in step S70. If a determination is made that originals after page 2 exist on original placing portion 41 of ADF 4 in step S70, the "image input" subroutine is called in step S71. The "image input" subroutine is carried out, and then a determination is made as to whether the data is registered in the transmission list or not in step S72, and only when the data is registered in the transmission list, the contents of image memory 67 are written in hard disc 64 in step S73. At this time, in step S73, the data after page 2 is registered in the transmission list. Also, when a determination is made that destination information is not registered in the transmission list, the number of cases for copying CN is set in the memory CNN as the number of copies immediately in step S74.

In step S75, the "image output" subroutine is called, the memory CNN in which the number of copies is set is decremented by "1" in step S76, and the routine from the step S75 to step S77 is repeatedly carried out until the memory CNN attains "0" in step S77.

When the memory CNN attains "0" in step S77, a determination is made as to whether an original is placed on ADF4 or not again in step S70.

If a determination is made in step S70 that there is no original provided on ADF 4 and copying or reading of images of all the originals is finished, one record is taken out of the transmission list of hard disc 64 in step S78, and a determination is made as to whether the contents corresponding to all the records of the transmission list specified have been completed or not in step S79. If all the records have not been read out, the objective image corresponding to the record number read out of the transmission list is read from hard disc 64 in step S80. In step S81, the destination information is read from the objective destination file, and in step S82, an image processing apparatus at the destination is called. A determination is made as to whether the image processing apparatus at the destination is being used or not in step S83, and if it is not in use, the transmission process of electrically transmitting the information through a communication line is performed in step S84. Then, if a determination of the end of all the records is made in step S79 during processing of the routine from steps S78 to S83, it gets out of the routine. If the data is not registered in the transmission list, a determination of all records finished is made in step S79.

Figure 11:
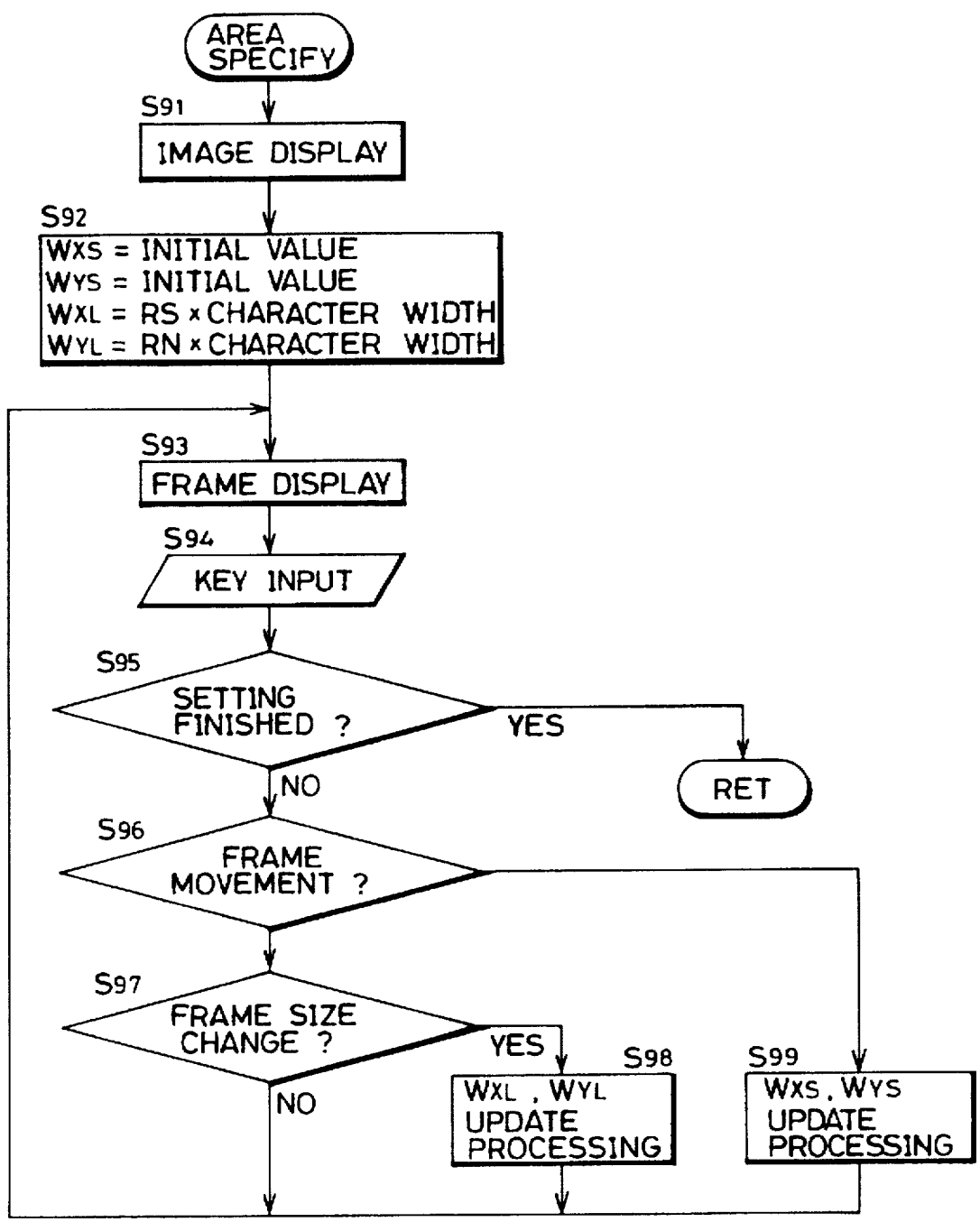
FIG. 11 is a flow chart diagram of an "area specifying" routine employed in an image processing apparatus of one embodiment of the present invention.

In step S46 of FIG. 8, if the "area specify" routine is called, the "area specify" routine shown in FIG. 11 is started.

First, image display is made in step S91, and in step S92, as parameters, the area starting X-coordinates as the X-coordinates $W_{XS}$ at the left upper end of the frame, the area starting Y-coordinates as the Y-coordinates $W_{YS}$ at the left upper end of the frame, the $RS_X$ character width as the length $W_{XL}$ in the X direction of the frame, and the $RN_X$ character height as the length $W_{YL}$ in the Y direction of the frame are inputted. In step S93, a frame is displayed on the basis of the coordinates of the area starting X-coordinates of the X-coordinates $W_{XS}$ at the left upper end of the frame, the area starting Y-coordinates of the Y-coordinates $W_{YS}$ at the left upper end of the frame, the $RS_X$ character width of the length in the X direction of the frame, and the $RN_X$ character height of the length $W_{YL}$ in the Y direction of the frame. In step S94, by input with keyboard 69, the area starting X-coordinates of X-coordinates $W_{XS}$ at the left upper end, the area starting Y-coordinates of Y-coordinates Wys at the left upper end of the frame, the $RS_X$ character width of X direction length $W_{XL}$ of the frame, and the $RN_X$ character height of Y direction length $W_{YL}$ of the frame are changed. When setting ends, end of setting is inputted. If a determination of end of setting is not made in step S95, that means input to be made, so a determination is made about frame movement in step S96, and if it is not required, change in size of the frame is determined in step S97. If frame movement and change in size of the frame are not required, as a result, end of setting is determined in step S95 to end the routine.

When frame movement is required in step S96, in step S99, values of X-coordinates $W_{XS}$ at the left upper end, and Y-coordinate $W_{YS}$ at the left end are renewed. If change in size of the frame is required in step S97, the values of the lateral width of X direction length $W_{XL}$ of the frame and the longitudinal length of Y direction length $W_{YL}$ of the frame are changed in step S98.

Figure 12:
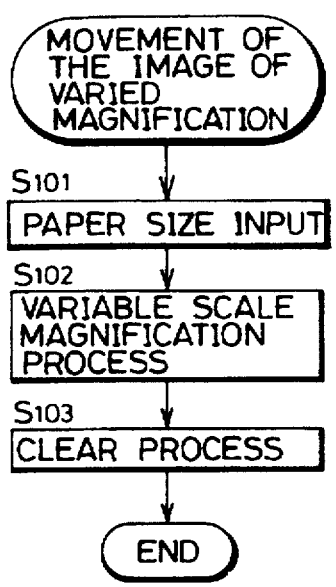
FIG. 12 is a flow chart diagram of a "movement of the image of varied magnification" routine employed in image processing apparatus of one embodiment of the present invention.

If the "movement of the image of varied magnification" routine is called in step S48 of FIG. 8, the "movement of image of varied magnification" routine shown in FIG. 12 is carried out.

First, the paper size for copying is supplied in step S101, whereby a varied scale magnification process is carried out in step S102, and a clear process for clearing the image data and so forth is performed in step S103 to end the routine.

In this varied scale magnification process, from the paper size lateral direction width of X direction length and the paper size longitudinal direction length of Y direction length, on the basis of the values of the area starting X-coordinates of X-coordinates $W_{XS}$ at the frame left upper end, the area starting Y-coordinates of Y-coordinates $W_{YS}$ at the frame left upper end, the lateral width of X direction length $W_{XL}$ of the frame, and the longitudinal length of Y direction length $W_{YL}$ of the frame, its magnifications in the longitudinal and lateral directions are determined.

Figure 19:
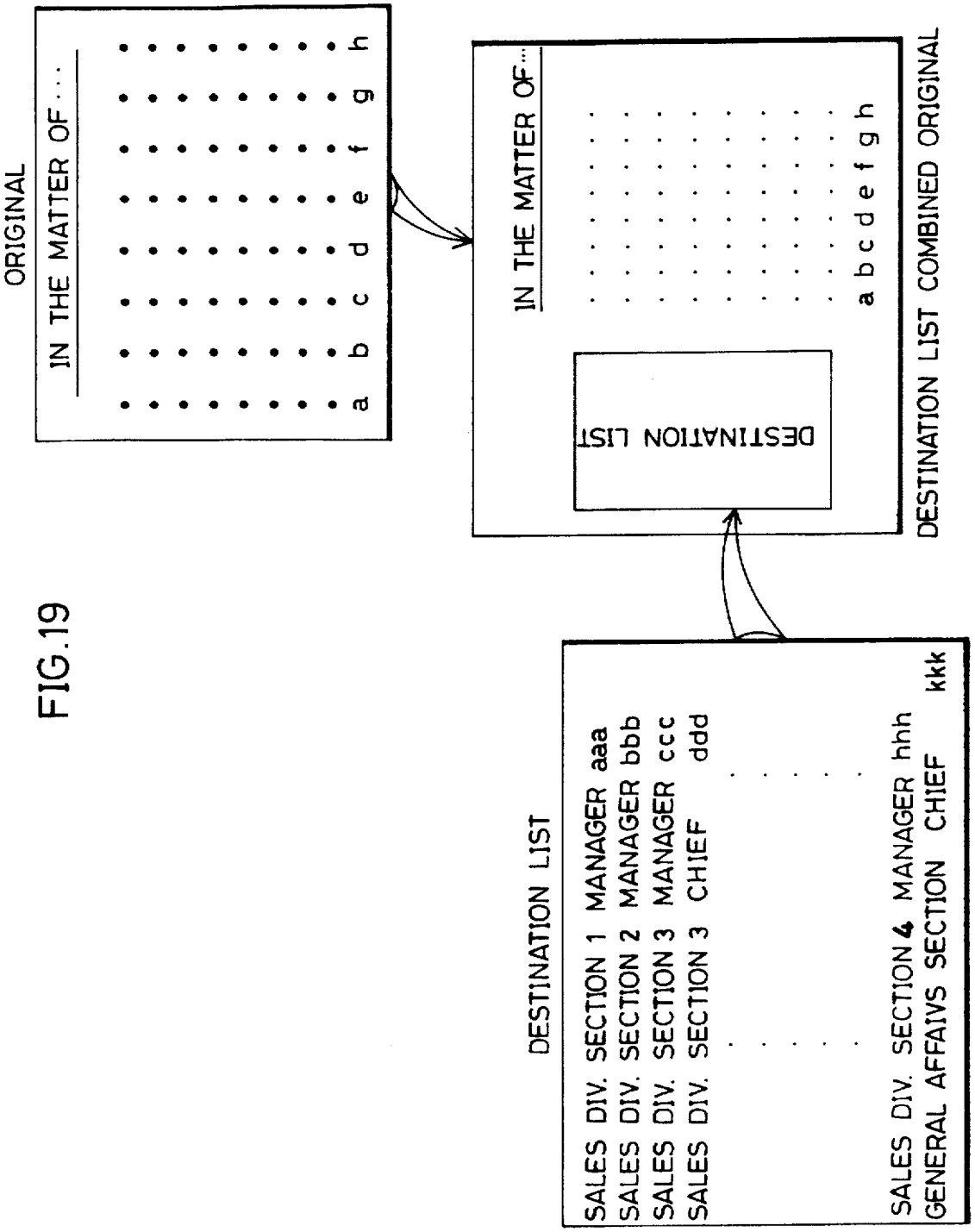
FIG. 19 is a diagram for describing list composite image data employed in image processing apparatus of one embodiment of the present invention.

This example will be described in detail. First, the area starting X-coordinates of X-coordinates $W_{XS}$ at the frame left upper end, the area starting Y-coordinates of Y-coordinates $W_{YS}$ at the frame left upper end, the lateral width of X direction length $W_{XL}$ of the frame, and the longitudinal length of Y direction length $W_{YL}$ of the frame are secured as a space in which the destination list is written on the copy paper. Then, in the space except for the region for the destination list in the copy paper, as shown in the diagram for describing an example of list composite image data of the present embodiment of FIG. 19, the image is formed with an original image reduced in longitudinal and/or lateral direction(s), in which the original image is reduced by a process of thinning out picture elements in the longitudinal and/or lateral direction(s).

Figure 13:
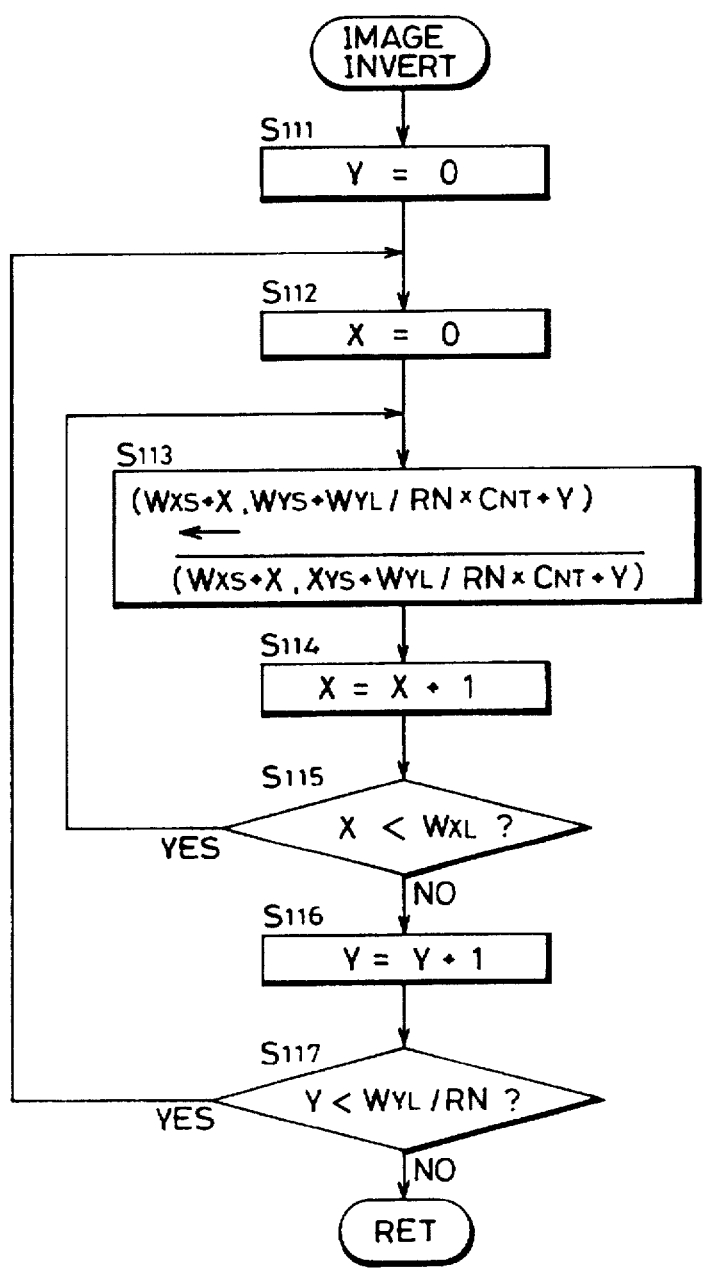
FIG. 13 is a flow chart diagram of an "image inversion" routine employed in image processing apparatus of one embodiment of the present invention.

If the "image inversion" routine is called in step S60 or step S62 of FIG. 9, the "image inversion" routine shown in FIG. 13 is started.

In this routine, first, memory Y is cleared in step S111, and memory X is cleared in step S112. In step S113, $W_{XS}+X$, $W_{YS}+W_{YL}/RN \times C_{NT}+Y$ is changed to $W_{XS}+X$, $W_{YS}+W_{YL}/RN \times C_{NT}+Y$, and the image is inverted. The inverted destination name is displayed in which a dotted portion is inverted in white and black as shown in the example of a destination list of this embodiment of FIG. 16. In step S114, X is incremented by "1", a determination is made as to whether the contents of the memory X is smaller than $W_{XL}$ or not in step S115, and if the contents of the memory X is smaller than $W_{XL}$, the process of the routine from step S113 to step S115 is repeatedly carried out. If the contents of the memory X is no less than $W_{XL}$, the memory Y is incremented by "1" in step S116, and a determination is made as to whether the contents of the memory Y is smaller than $W_{YL}/RN$ or not in step S117, if the contents of the memory Y is smaller than $W_{YL}/RN$, the process of the routine from step S112 to step S117 is repeatedly carried out. Then, when the memory Y is not less than $W_{YL}/RN$, this routine ends.

Figure 14:
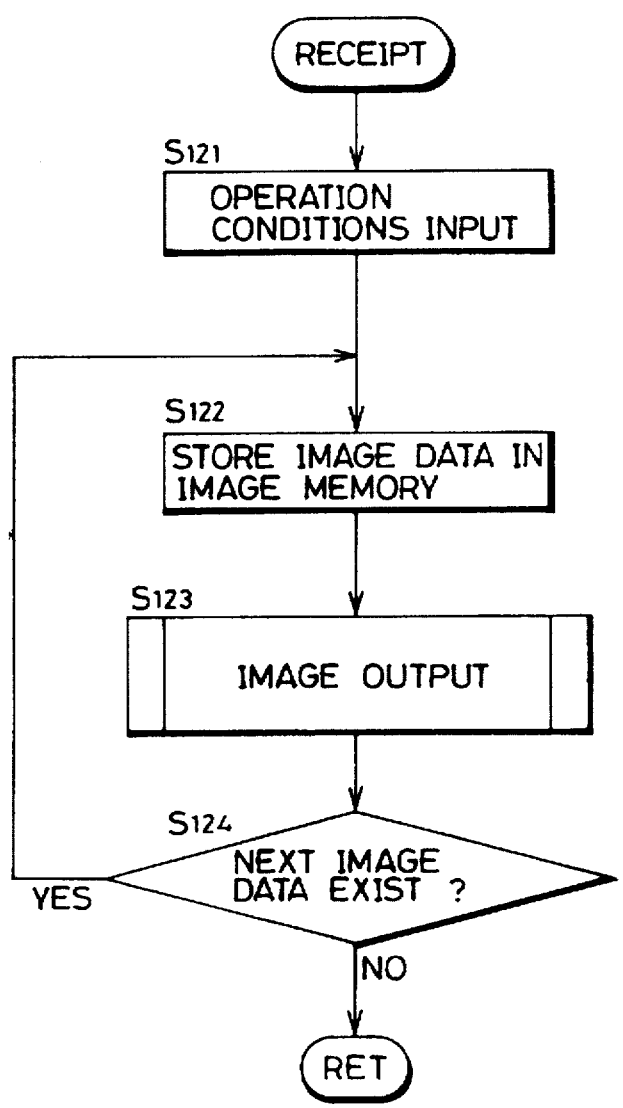
FIG. 14 is a flow chart diagram of a "receipt" routine employed in image processing apparatus of one embodiment of the present invention.

On the other hand, when the "receipt" routine is called in step M8, the image processing apparatus starts the process of the "receipt" routine employed in the image processing apparatus of the embodiments of FIG. 14.

First, operational conditions such as paper size are supplied in step S121, the received image data are stored in image memory 67 in step S122, and the "image output" routine is called in step S123 for copying. Subsequently, a determination is made as to whether there exists next image data or not in step S124, and the process of the routine of step S122 to step S124 is repeatedly carried out until no image data exists. When the next image data does not exist in step S124, this routine ends.

As described above, in the above embodiment, the copying process and the transmitting process are carried out in a single operation in accordance with the stored destination information, which facilitates management of the destinations and reduces mistakes. By recording destinations on the first page, the first page indicating destinations does not have to be formed separately.

Although an image is recorded on paper by an image forming portion of the electrophotographic system in the above-described embodiment, this is not limited to the same and ones of the thermal recording system or the ink jet recording system may be introduced.

Although copying and transmission of images are determined in accordance with presence/absence of telephone numbers in the destination list, an operator may arbitrarily specify it with operation input other than telephone numbers. Furthermore, the destination list is stored in a hard disc, but it may be stored in a ROM and destinations may be read by addressing, or it also can be stored in an IC card.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:

reading means for reading an image of an original to produce image data;

copying means for performing a copying process for forming an image on paper on the basis of said image data;

transmitting means for performing a transmitting process for transmitting said image data to a receiver;

storing means for storing destination information related to a plurality of destinations;

determining means for determining, on the basis of said destination information, whether said copying process should be carried out or said transmitting process should be carried out to respective destinations; and controlling means for automatically controlling said copying means and said transmitting means to operate in series in accordance with determination results by said determining means.

2. The image processing apparatus according to claim 1, wherein said controlling means controls said copying means to perform said copying process the same number of times as the number of destinations determined to be subjected to the copying process by said determining means.

3. The image processing apparatus according to claim 2, wherein said controlling means controls said transmitting means to perform said transmitting process to a destination determined to be subjected to said transmitting process by said determining means after completion of said copying process.

4. An image processing apparatus, comprising:

reading means for reading an image of an original to produce image data;

storing means for storing destination information related to a plurality of destinations;

combining means for combining the image data from said reading means and the destination information from said storing means to produce composite data;

copying means for performing a copying process for forming said image on paper on the basis of said composite data;

transmitting means for performing a transmitting process for transmitting said composite data to a receiver;

determining means for determining, on the basis of said destination information, whether said copying process should be performed or said transmitting process should be performed to each of respective destinations; and controlling means for automatically controlling the copying means and the transmitting means to operate in series in accordance with determination results by said determining means.

5. The image processing apparatus according to claim 4, wherein said combining means performs a predetermined image process for destination information corresponding to the destinations indicative of said copying process and said transmitting process for destinations related to said destination information in said composite data.

6. The image processing apparatus according to claim 4, wherein said combining means changes magnification of said image data to magnified image data and combines said magnified image data with said destination information.

7. The image processing apparatus according to claim 6, wherein a selected destination included in said destination information is displayed.

8. The image processing apparatus according to claim 4, wherein said combining means moves said image data combines said image data with said destination information.

9. The image processing apparatus according to claim 8, wherein a selected destination included in said destination information is displayed.

10. An image processing apparatus, comprising:

reading means for reading an image of an original to produce image data;

copying means for forming an image on paper according to the image data produced by said reading means;

transmitting means for transmitting the image data produced by said reading means to a remote receiver;

storing means for storing destination information related to a plurality of destinations; and means for selectively actuating either said copying means or said transmitting means on the basis of the destination information stored in the storing means.

* * * * *